(12) United States Patent
Bosscha et al.

(10) Patent No.: US 7,676,598 B2
(45) Date of Patent: Mar. 9, 2010

(54) METHOD OF CONTROLLING COMMUNICATION BETWEEN A HEAD-END SYSTEM AND A PLURALITY OF CLIENT SYSTEMS

(75) Inventors: Albert Jan Bosscha, Hoofddorp (NL); Jaco du Plooy, San Diego, CA (US)

(73) Assignee: Irdeto Acess B.V. (NL)

( * ) Notice: Subject to any disclaimer, the term of this patent is extended or adjusted under 35 U.S.C. 154(b) by 600 days.

(21) Appl. No.: 11/353,340

(22) Filed: Feb. 13, 2006

(65) Prior Publication Data

US 2006/0184683 A1 Aug. 17, 2006

(30) Foreign Application Priority Data

Feb. 14, 2005 (EP) .................................. 05101087

(51) Int. Cl.
*G06F 15/16* (2006.01)
*G06F 15/173* (2006.01)

(52) U.S. Cl. ........................................ 709/241; 709/230

(58) Field of Classification Search .................. 709/230
See application file for complete search history.

(56) References Cited

U.S. PATENT DOCUMENTS

| | | | | |
|---|---|---|---|---|
| 6,061,791 | A * | 5/2000 | Moreau ....................... | 713/171 |
| 2002/0085506 | A1* | 7/2002 | Hundscheidt et al. ....... | 370/254 |
| 2003/0163690 | A1 | 8/2003 | Stewart | |
| 2003/0218980 | A1* | 11/2003 | Fukushima et al. ......... | 370/230 |
| 2004/0101138 | A1* | 5/2004 | Revital et al. ............... | 380/210 |
| 2004/0190514 | A1* | 9/2004 | Uchiyama et al. ........... | 370/390 |
| 2004/0264463 | A1* | 12/2004 | Fukushima et al. ......... | 370/390 |

FOREIGN PATENT DOCUMENTS

WO WO 02/063850 A2 * 10/2001
WO WO-0191465 A2 11/2001

OTHER PUBLICATIONS

Hoyoung Lee et al, Intelligent Multicast Router Discovery Mechanism n Moble Multicast, Jul. 2005, IEEE Computer Society, p. 152-156.*

(Continued)

*Primary Examiner*—Patrice Winder
*Assistant Examiner*—Taylor Elfervig
(74) *Attorney, Agent, or Firm*—Schwegman, Lundberg & Woessner, P.A.

(57) ABSTRACT

A method of controlling communication between a head-end system and a number of client systems through a network, wherein, for each receiver, only a nearest one of the multicast router systems in the network is configured to forward a copy of a message addressed to the multicast groups of which the receiver is a member directly to the receiver, includes: maintaining subscriber group information linking each registered one of the number of client systems to an associated one of a plurality of subscriber groups, and allocating registered client systems to at least one multicast group, such that all client systems associated with a particular subscriber group are in a common multicast group. Information uniquely identifying the nearest multicast router system nearest to a receiver for a first client system is obtained, and the first client system is assigned to a subscriber group including at least one further client system having the same nearest multicast router system.

22 Claims, 4 Drawing Sheets

OTHER PUBLICATIONS

S. Deering, Internet Group Management Protocol Version 1, rfc1112.txt, Aug. 1989, Publisher: www.ietf.org, Published in: Internet, 17 pgs.*

"European Search Report for Application No. EP 05101087", (May 25, 2005), 2 pgs.

Katabi, Dina, "The Use of IP-Anycast for Building Efficient Multicast Trees", *Global Telecommunications Conference—Globecom '99*, (1999), 1679-1688.

Koh, Seok J., et al., "Enhancement of the CBT Multicast Routing Protocol", *Proceedings of the Eighth International Conference on Parallel and Distributed Systems (ICPADS'01)*, (2001), 209-213.

* cited by examiner

METHOD OF CONTROLLING COMMUNICATION BETWEEN A HEAD-END SYSTEM AND A PLURALITY OF CLIENT SYSTEMS

CLAIM OF PRIORITY

The present patent application claims the priority benefit of the filing date of European Application (EPO) No. 05101087.4 filed Feb. 14, 2005, the entire content of which is incorporated herein by reference.

BACKGROUND

WO 01/91465 describes a mechanism for broadcasting digital media content in a secure manner to a general group of end users, while still maintaining the desired degree of specificity in terms of those end users who actually use or access the digital media content. An end user device and a broadcaster head-end communicate through at least one channel. The security features for the content are provided by encrypting the content, such that access to the media content is only possible for authorized users. The access information is distributed through an ECM (control message), which enables the end user device to create the correct key. The end user device is only able to generate the key if the end user device also receives an EMM, or entitlement message, from the broadcaster head-end. The EMM could be sent to a plurality of different end user devices at one time, as a broadcast or multicast, such that a group of end user devices would receive the information at once. A particular EMM could be designated for one group of end user devices, according to a particular subscription plan or other type of payment structure and/or according to the network address of the members of the group of end user devices.

A problem with an approach using the network address of the members of the group of end user devices, is that it is not very effective in providing information regarding the network topology. This means that end user devices at disparate branches of a tree sourced at the head-end could end up in one group, which in turn results in a large amount of network traffic as multicast router systems close to the head-end system provide copies of the group message to several adjoining rnulticast router systems.

BRIEF DESCRIPTION OF THE DRAWINGS

An example embodiment of the invention will now be explained in further detail with reference to the accompanying drawings, in which.

DETAILED DESCRIPTION

Figure 1:
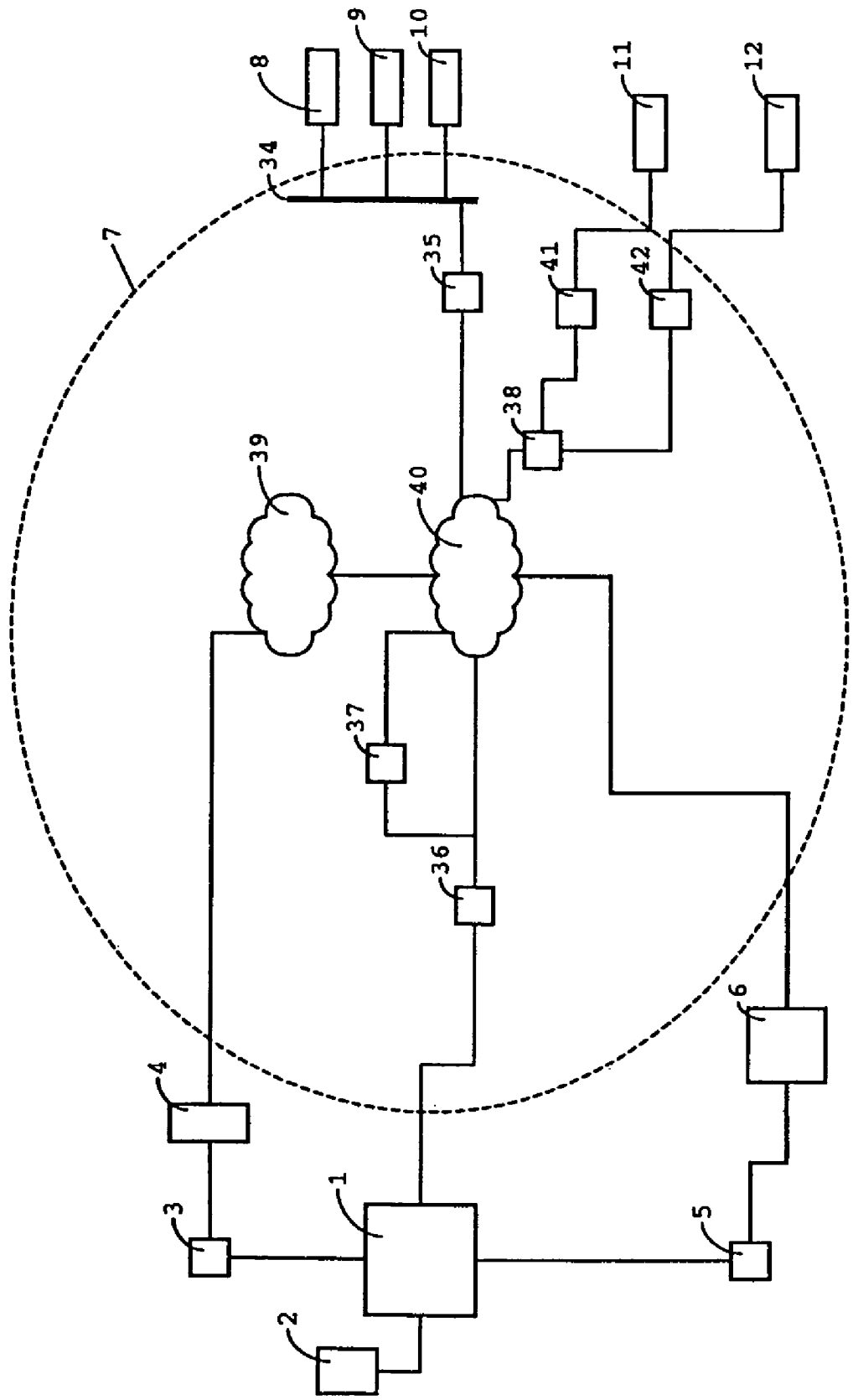
FIG. 1 shows in schematic form a network architecture for application of the methods defined above to enable subscribers to receive encrypted content data.

An example embodiment of the invention relates to a method of controlling communication between a head-end system and a number of client systems through a network including a plurality of multicast router systems and receivers, each multicast router system being configured to forward multicast messages transmitted from the head-end and addressed to respective multicast groups to receivers enabled to accept for a client system messages addressed to any multicast group of which the receiver is a member, wherein, for each receiver, only a nearest one of the multicast router systems is configured to forward a copy of a message addressed to the multicast groups of which the receiver is a member directly to the receiver, which method includes:

maintaining subscriber group information linking each registered one of the number of client systems to an associated one of a plurality of subscriber groups, and allocating registered client systems to at least one multicast group, such that all client systems associated with a particular subscriber group are in a common multicast group, a server in the head-end being arranged to multicast subscriber group messages to client systems in messages addressed to a multicast group, each subscriber group message being intended for all client systems in a subscriber group.

An example embodiment of the invention also relates to a system for controlling communication between a head-end system and a number of client systems through a network including a plurality of multicast router systems and receivers, each multicast router system being configured to forward multicast messages transmitted from the head-end and addressed to respective multicast groups to receivers enabled to accept for a client system messages addressed to any multicast group of which the receiver is a member, wherein, for each receiver, only a nearest one of the multicast router systems is configured to forward a copy of a message addressed to the multicast groups of which the receiver is a member directly to the receiver, which system includes a database for maintaining subscriber group information linking each registered one of the number of client systems to an associated one of a plurality of subscriber groups, wherein the system is configured to allocate registered client systems to at least one multicast group, such that all client systems associated with a particular subscriber group are in a common multicast group, a server in the head-end being arranged to multicast subscriber group messages to client systems in messages addressed to a multicast group, each subscriber group message being intended for all client systems in a subscriber group.

An example embodiment of the invention also relates to a method of requesting delivery to a first client system of group messages from a head-end system in communication with a number of further client systems through a network including a plurality of multicast router systems and receivers, each multicast router system being configured to forward multicast messages transmitted from the head-end and addressed to respective multicast groups to receivers enabled to accept for a client system messages addressed to any multicast group of which the receiver is a member, wherein, for each receiver, only a nearest one of the multicast router systems is configured to forward a copy of a message addressed to the multicast groups of which the receiver is a member directly to the receiver, the head-end system including
a registration system for maintaining group information linking each registered one of the number of client systems to an associated one of a plurality of groups and allocating multicast addresses to the client systems such that all client systems associated with a particular group have a common multicast address, and
a server, arranged to multicast the group messages to at least one of the client systems in messages having a multicast address, each group message being intended for all client systems in a group.

An example embodiment of the invention also relates to a system for requesting delivery to a first client system of group messages from a head-end system in communication with a number of further client systems through a network including a plurality of multicast router systems and receivers,
each multicast router system being configured to forward multicast messages transmitted from the head-end and addressed to respective multicast groups to receivers enabled to accept for a client system messages addressed to any multicast group of which the receiver is a member,
wherein, for each receiver, only a nearest one of the multicast router systems is configured to forward a copy of a message addressed to the multicast groups of which the receiver is a member directly to the receiver,
the head-end system including
a registration system for maintaining group information linking each registered one of the number of client systems to an associated one of a plurality of groups and allocating multicast addresses to the client systems such that all client systems associated with a particular group have a common multicast address, and
a server, arranged to multicast the group messages to at least one of the client systems in messages having a multicast address, each group message being intended for all client systems in a group.

An example embodiment of the invention seeks to provide methods and systems of the types defined in the opening paragraphs that enable more efficient use of the bandwidth of the network.

A method of controlling communication according to an example embodiment of the invention, is characterised by obtaining information uniquely identifying the nearest multicast router system nearest to a receiver for a first client system, and
assigning the first client system to a subscriber group including at least one further client system having the same nearest multicast router system.

Because only a nearest one of the multicast router systems is configured to forward a copy of a message addressed to the multicast groups of which the receiver is a member directly to the receiver, the messages addressed to multicast groups are forwarded by the other multicast router system via the shortest path to the nearest multicast router system. Because all client systems associated with a particular subscriber group are in a common multicast group, the number of messages can be kept relatively low. Because the first client system is assigned to a subscriber group including at least one further client system having the same nearest multicast router system, the multicast messages are only sent to the individual client systems over the 'last hop', either as unicast (e.g. two messages) or using multicast capabilities provided at the data link level.

In an example embodiment, the operation of obtaining information uniquely identifying the nearest multicast router system includes receiving a registration request message from the first client system, including a network address unique to the nearest multicast router system nearest to the receiver for the first client system.

The example embodiment makes use of the fact that the receiver accepting multicast messages for a client system must in most networks register with the nearest multicast router system. Thus, it will have, or have the capability to obtain, knowledge of the identity of the nearest multicast router system. This knowledge is more difficult to obtain at nodes in the network that are far removed from the network node formed by the nearest multicast router system.

An example embodiment of the method includes receiving a registration request message from the first client system including an identification of the first client system, and
verifying that the first client system is authorised to receive messages intended for all client systems in the subscriber group,
wherein the first client system is only assigned to the subscriber group if authorised.

Because the registration request message from the first client system includes an identification of the first client system, it can be sent through a proxy.

An example variant includes receiving a registration request message including a digital signature, using the identification to retrieve a public key of the client system, and using the public key to verify the authenticity of the signature.

Thus, a mechanism to detect requests from rogue client systems posing as the first client system is provided, in one example embodiment.

An example embodiment includes receiving a registration request message from the first client system, including a network address unique to a receiver configured to accept multicast messages for the first client system, and returning a registration response message to the network address unique to the receiver upon assigning the first client system to the subscriber group, the registration response message including a multicast network address of at least the common multicast group of the subscriber group to which the first client system has been assigned.

Because the registration response message is sent to the unique network address of the receiver, e.g. unicast, the receiver need not yet be configured to accept messages under the multicast address. The registration response message includes the multicast network address. This allows subsequent configuration of the receiver to accept messages under that address and/or configuration of one or more multicast router systems to forward to the receiver the group messages sent under the multicast network address.

An example variant includes receiving a registration request message including verification data and forming a registration response message including data representative of at least part of the verification data.

This prevents "man-in-the-middle" attacks to trick the first client system into accepting messages from another source than the server in the head-end. It may be particularly useful in all cases where the group messages are sent to client systems having a function in enabling decryption of encrypted messages and/or scrambled content. In such embodiments, attempts to send the client system group messages in order to learn secret keys stored by the client system are thwarted.

An example embodiment includes receiving a registration request message from the first client system, including a network address unique to a receiver configured to accept multicast message for the first client system, returning a registration response message to the network address unique to the receiver upon assigning the first client system to the subscriber group, the registration response message including at least one key of at least one key pair, and subsequently transmitting at least one group message addressed to the common multicast group and encrypted under the other key of the key pair.

Thus, the first client system is enabled to receive encrypted group messages, encrypted under, for example, a key common to the subscriber group. Because the registration response message is returned to the network address unique to the receiver, the key information is not received by other receivers or client systems. In particular, it is not possible to obtain the key or keys by joining the multicast group.

In an example embodiment, the network is a packet switched network, In an example embodiment using the Internet Protocol, includes transmitting group messages from the server in single packets having a payload and a header, wherein each packet payload is encrypted separately.

Thus, the links between the head-end and each of the receivers accepting packets for client systems in the same subscriber groups are cryptographically protected.

An example embodiment includes assigning the first client system to a subscriber group including only further client systems having the same nearest multicast router system.

Thus, the server in the head-end need send each subscriber group message only once, as a multicast message, to reach all members of the subscriber group.

An example embodiment includes, upon determining that a different one of the multicast router systems has become the nearest multicast router system for a receiver enabled to accept multicast messages for the first client system, removing the first client system from the subscriber group.

This embodiment allows the first client system to receive group messages through different receivers during its lifetime. At the same time, efficiency of communication from the head-end is maintained.

According to another example aspect, the system for controlling communication between a head-end system and a number of client systems through a network including a plurality of multicast router systems and receivers, according to an example embodiment of the invention, characterised in that the system is configured to obtain information uniquely identifying the nearest multicast router system nearest to a receiver for a first client system, and to assign the first client system to a subscriber group including at least one further client system having the same nearest multicast router system.

In an example embodiment, the system is configured to execute a method as described herein.

According to another aspect of an example embodiment of the invention, the method of requesting delivery to a first client system of group messages from a head-end system in communication with a number of further client systems through a network is
characterised by
obtaining information uniquely identifying a nearest multicast router system nearest to a receiver for the first client system, and transmitting a registration request message to the registration system including the obtained information, to enable the registration system to assign the first client system to a subscriber group including at least one further client system having the same nearest multicast router system.

Thus, the system executing the method co-operates with the head-end to increase the efficiency with which group messages are transferred to the client systems.

In an example embodiment, the information uniquely identifying the nearest multicast router system is a network address unique to the multicast router system and obtained by exchange of messages in accordance with a network protocol.

Thus, use is made of available mechanisms to learn the identity of the nearest multicast router system. This makes the method easy to implement. It requires no modification to the network protocols used for multicasting, but only modifications at the head-end and the receiver and/or client system.

An example embodiment includes receiving a registration response message including the common multicast address allocated to the subscriber group to which the first client system has been assigned, and transmitting a message notifying the nearest multicast router system of the common multicast address.

Thus it is ensured that the receiver configured to accept the subscriber group messages for the first client system actually receives substantially all of the subscriber group messages.

In one example embodiment, wherein the receiver includes an interface to at least one device in which the first client system is included, the method includes receiving at least information representative of a subscriber identification from the first client system through the interface and transmitting a registration request message to the registration system further including the subscriber identification.

Thus, the method enables the receiver to act as a proxy for client systems of varying identity. This has the advantage that such client systems can be transferred to other network locations.

In an example embodiment, wherein the first client system is included in a device having an interface to the receiver for the first client system, the method includes
receiving the information uniquely identifying a nearest multicast router system nearest to the receiver from the receiver through the interface
and returning the registration request message through the interface to the receiver for forwarding to the registration system.

This embodiment also has the advantage of allowing the first client system to be used in conjunction with varying receivers at varying locations within the network. In addition, the registration request message is thus formed by the client system, allowing the use of a relatively simple receiver.

In an example variant, wherein the first client system is included in a tamper-proof environment of a secure device, In an example embodiment a smart card, wherein the first client system is arranged to store a secret key, the registration request message is at least signed by the first client system.

This provides an extra safeguard to ensure that the first client system is in fact associated with a valid subscriber.

An example embodiment includes retrieving a network address unique to the receiver for the first client system and including the network address unique to the receiver in the registration request message.

This embodiment allows secret information to be returned to the first client system in response to the registration request message without other receivers accepting the message.

According to another aspect of an example embodiment of the invention, the system for requesting delivery to a first client system of group messages from a head-end system is configured to carry out a method of requesting delivery to a first client system of group messages from a head-end system according an example embodiment of the invention.

According to another aspect, an example embodiment of the invention provides a computer program configured, when run on a computer, to enable the computer to carry out a method according to an example embodiment of the invention.

In FIG. 1, a first head-end system, according to an example embodiment, includes a CA system 1, a subscriber management system (SMS) 2, a pre-encryption system 3 and a Videoon-Demand (VOD) server 4. A second head-end system includes the same CA system 1 and SMS 2, as well as a scrambling system 5 and broadcast server 6. The broadcast server 5 is configured to broadcast content data, such as video, audio or textual data, over the Internet, denoted by reference numeral 7 in FIG. 1. In an alternative embodiment, the content data is broadcast as a Digital Video Broadcast (DVB) service, via a satellite, cable or terrestrial network, or a combination. A variant wherein the content data is transmitted from the VOD server 4 by such means is also conceivable.

The content data is transmitted in MPEG-2 format. Each event, be it supplied on demand by VOD server 4 or broadcast by broadcast server 6, is made up of at least one elementary stream, also known as a component. These may include one or ore streams of video data, audio data, teletext data, etc. At least the audio and video data have a common time base. The elementary stream data are carried in so-called Packetised Elementary Stream (PES) packets. A PES stream consists of PES packets that all comprise payloads consisting of data from a single elementary stream, and that all include the same stream identification, a code included in headers of the PES packets.

The PES packets are in turn carried by MPEG-2 Transport Stream (TS) packets. A PES packet may be distributed over multiple MPEG-2 TS packets. The content data is scrambled, either at the PES packet level or at the transport stream level, under a rapidly varying Control Word (CW). CWs are provided over the Internet 7 in Entitlement Control Messages (ECMs). In the example, they are carried in a separate MPEG-2 Transport Stream multiplexed with the streams transmitted from the VOD server 4 and broadcast server 6. The CWs in the ECMs are encrypted under a product key, which is varied at a lower rate than the CWs. Groups of receivers entitled to decode a particular service are provided with the product key by means of Entitlement Management Messages (EMMs). These EMMs are examples of group messages, messages intended for a plurality of subscribers.

In the example of FIG. 1, group messages are transmitted through the Internet 7 by the CA system 1 in multicast Internet Protocol (IP) datagrams.

As an example, five receiver systems are shown, each including one of five Integrated Receiver Decoders (IRDs) 8-12. The IRDs 8-12 could be implemented as a personal computer system with a network card or modem, as a so-called set-top box for passing a video and audio signal to a television set, as a digital television set with a network card or modem, as a mobile phone handset with multi-media capabilities, etc.

Figure 2:
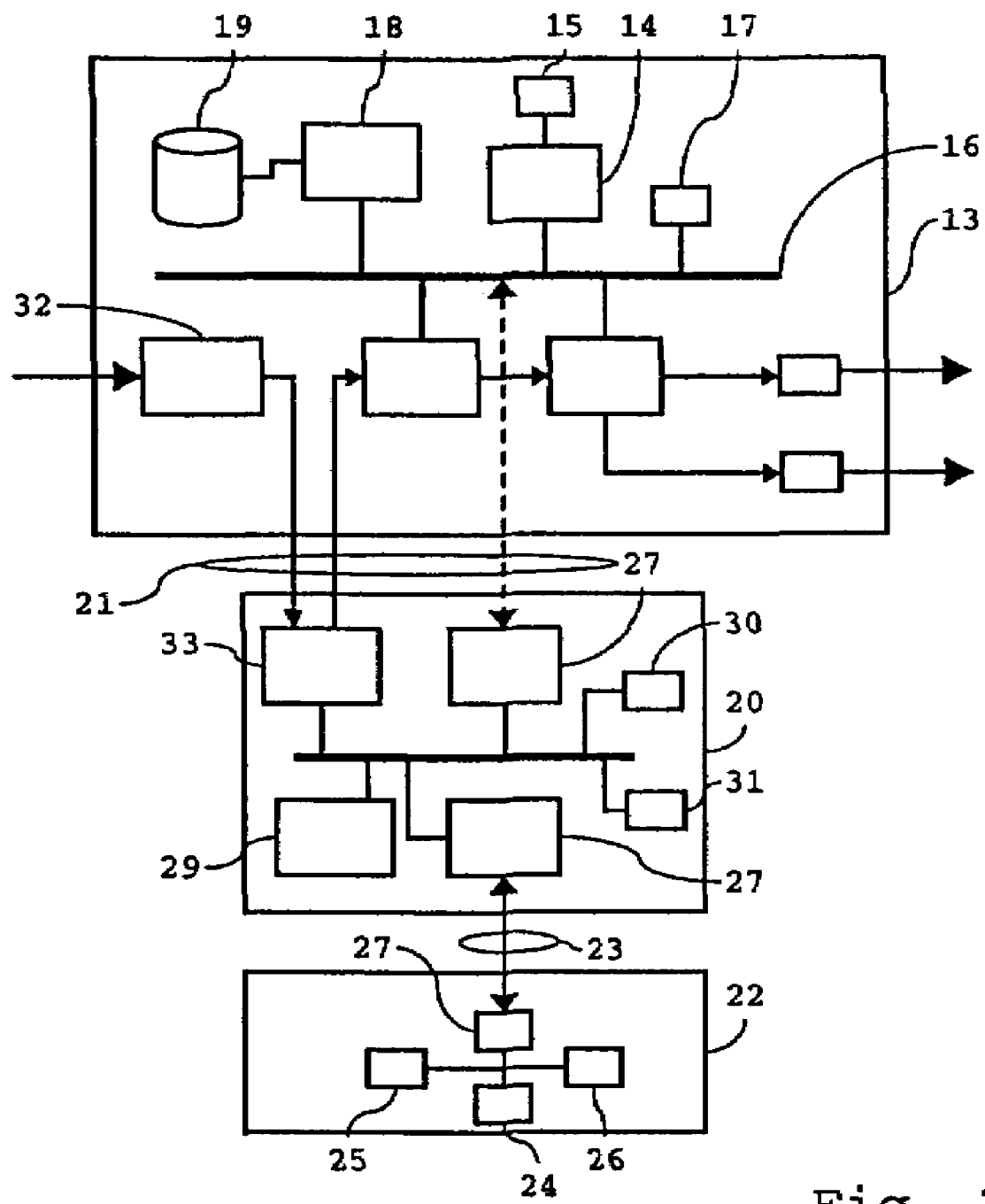
FIG. 2 shows in schematic form a receiver system including a receiver/decoder and a client system in the form of a Conditional Access Module and smart card.

A detailed example of a receiver system is shown in FIG. 2, in the shape of an IRD device 13. The IRD device 13 includes a processor 14 having access to (volatile) main memory 15 and communicating control commands and data on a system bus 16. A computer program enabling the processor 14 to participate in a process by which delivery of EMMs is requested is stored in Read-Only-Memory (ROM) 17 and/or accessible to the processor 14 through a controller 18 providing access to a storage medium 19, such as a hard disk unit or optical medium reader. Such a storage medium 19 may also be used to load the code to the ROM 17 to provide the IRD device 13 with the required functionality, as is known in the art.

In the shown example, the receiver system also includes a CA module 20, communicating with the IRD device 13 through an interface 21, in an example embodiment complying with the Common Interface standard. The CA module 20, in turn, is arranged to cooperate with an access token, in this case a smart card 22, through a smart card interface 23.

In this example, the smart card 22 is provided with a main processor 24, memory 25 and a cryptographic co-processor 26. The smart card 22 stores subscription data corresponding to data maintained in the SMS 2. In one embodiment, it is a multi-sector smart card, arranged to process the content data provided as part of a Video-on-Demand subscription separately from those provided as part of a subscription to broadcast services.

The CA module 20 has an interface module 27 for receiving commands from the IRD device 13 and a smart card interface module 28 for exchange of data and/or instructions with the smart card 22. It further includes a processor 29, ROM 30 and RAM 31 for executing various operations in a process of providing access to scrambled content data.

The IRD device 13 includes a network interface device 32, in an example embodiment an Ethernet card. Alternatively embodiments may include a modem, a wireless interface device for communicating with an external xDSL modem, etc. To simplify the following description, it will be assumed that the network interface device 32 is an Ethernet card.

The network interface device 32 passes IP datagrams through a network stack implemented in software. The payloads, in the form of scrambled MPEG-2 TS packets are passed to a filtering and de-scrambling module 33. This module 33 filters out of the received multiplex the packets belonging to a service to which the IRD device 13 has been instructed to tune in. ECMs and EMMs are passed to the CA module 20. The CA module 20 provides the smart card 22 with the (encrypted) ECMs and EMMs. The smart card 22 retrieves product keys from the EMMs, which are stored in memory 25. The product keys are used to decrypt the CWs, which are returned to the filtering and de-scrambling module 33. In an alternative embodiment (not shown), the IRD itself includes at least one smart card interface, so that the CA module 20 is not needed.

The network interface device 32 is augmented by software, enabling the IRD device 13 to implement various network protocols. The combination enables the IRD device 13 to accept IP datagrams addressed to a multicast group. That is to say that the IRD device 13 is enabled to accept IP datagrams including a header carrying an IP multicast address. This address is recognisable as such by the first part, a special address prefix assigned to multicast addresses. The IRD device 13 joins the multicast group using the Internet Group Management Protocol IGMP.

Returning to FIG. 1, it is shown in schematic fashion that first, second and third IRDs 8-10 are included as nodes in a local area network (LAN) 34. A first multicast router 35 functions to accept IP datagrams having multicast IP addresses assigned to groups of which any of the first, second and third IRDs 8-10 is a member. It translates the IP multicast address into a link layer multicast address, in this case an Ethernet multicast address. The IGMP enables the first, second and third IRDs to report their multicast group memberships to the first multicast router 35, which is the one nearest to them.

Second, third and fourth multicast routers 36-38 are shown explicitly. It will be understood that first and second network segments 39,40, shown only very schematically, will comprise many more of such multicast routers. Fifth and sixth routers 41,42 are not multicast-enabled. A fourth multicast router 38 is the multicast router nearest to fourth and fifth IRDs. The fourth multicast router 38 transforms multicast IP datagrams addressed to groups joined by the fourth and fifth IRDs 11,12 into IP datagrams with a header carrying respective unicast addresses of the fourth and fifth IRDs 11,12 in the destination address field.

Each of the IRDs 8-12 in FIG. 1 interfaces with a smart card (not shown) such as the smart card 22 or, more accurately, with an implementation of a client system as comprised in a sector of the smart card 22. The following example supposes that the client system is usable to enable the IRD device 13 to receive content data from the VOD server 4.

Figure 3:
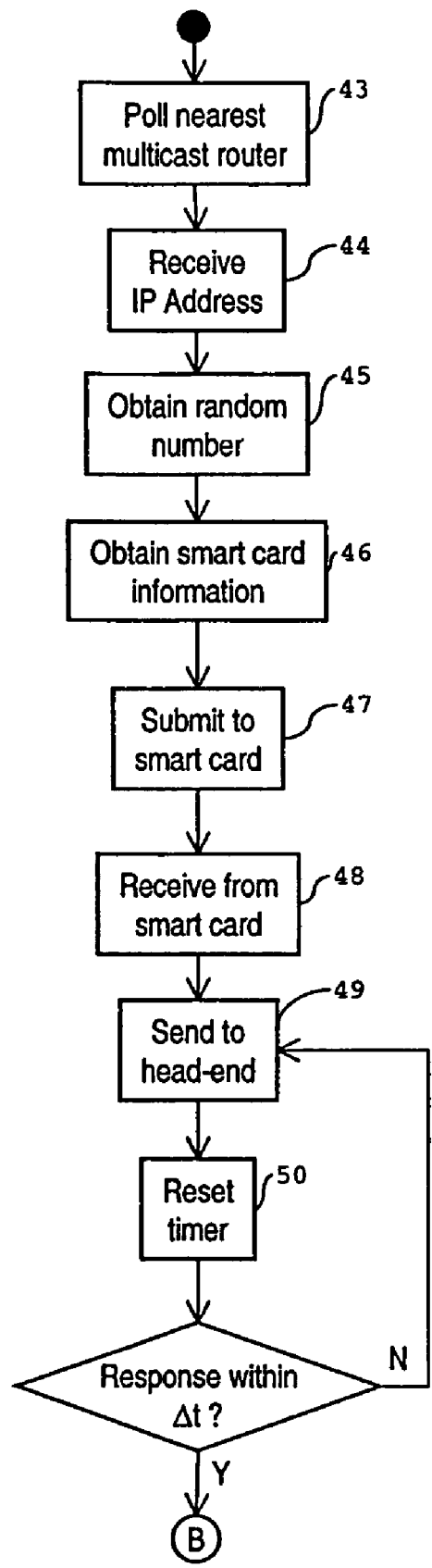
FIG. 3 is a flow chart relating to a first variant of a method of requesting registration of a client system.

In an embodiment illustrated in FIG. 3, the IRD device 13 performs a method of requesting delivery of EMMs, e.g. group messages, enabling decryption of ECMs carrying encrypted CWs for de-scrambling a requested VOD service.

In a first operation 43, the IRD device 13 sends out a message to obtain the IP address of the nearest multicast router. The nearest multicast router is the multicast router among the multicast routers 35-38 that bypasses all other multicast routers when forwarding a multicast message to the IRD device 13. It would be the first multicast router 35 if the IRD device 13 corresponds to one of the first, second and third IRDs 8-10. It would be the fourth multicast router 38 if the IRD device 13 corresponds to one of the fourth and fifth IRDs 11,12 in FIG. 1. Which of the routers is the nearest router may depend on the routing protocol that router systems use to discover the shortest link to a particular destination. The first operation 43 may also comprise listening for a periodically transmitted announcement message from the nearest multicast router system.

In an alternative embodiment, the first operation 43 is replaced by a operation in which the IRD device 13 retrieves the network address of the nearest multicast router system from configuration information stored on the storage medium 19. Such configuration would be input by a user when setting up the IRD device 13.

In subsequent operation 44, the IRD device 13 receives the IP address of the nearest multicast router. It is noted that this IP address is the IP address assigned to an interface of the router, e.g. it is unique to the router. Although the operation 44 would normally follow the first operation 43, the operation 44 could also comprise receiving an ICMP re-direct message. This would happen if the multicast router first selected were not in actual fact the nearest router as determined by the routing protocol implemented by the routers.

The CA system 1 assigns each client system that requests a service to one of a plurality of subscriber groups. To this end, it, or alternatively the SMS 2, maintains subscriber group information linking each registered one of client systems to its assigned. At the same time, registered client systems are allocated to at least one multicast group, each multicast group corresponding to a multicast IP address. Upon receiving a message requesting delivery of EMMs from a particular IRD device 13 associated with a client system, the CA system allocates the client system to at least one multicast group, such that all client systems associated with the subscriber group of which that client system is a member have at least one allocated multicast group in common.

EMMs intended for all members of the subscriber group are multicast in multicast IP datagrams under the multicast IP address corresponding to the common multicast group. These EMM-carrying datagrams are multicast by a server included in the CA system. In an alternative embodiment, ECMs are also multicast in the same manner.

To ensure an efficient use of the Internet 7, the registration request message from the IRD device 13 includes the IP address obtained in operation 44. The CA system 1 assigns the first client system to a subscriber group including at least one further client system that has reported the same IP address as being that of the nearest multicast router. In an example embodiment, the CA system ensures that the subscriber group to which a requesting client system is assigned contains only client systems with a common nearest multicast router.

The CA system 1 will, in an example embodiment, re-assign the client system to a different subscriber group upon determining that a different one of the multicast router systems has become the nearest multicast router system for a receiver enabled to accept multicast messages for the client system, thus removing the client system from the group to which it was previously assigned. This is an advantageous feature, because the client system will, as noted, be implemented partly on a sector of the smart card 22. Since the smart card 22 is a portable, tamper-proof, access token, it can be used in conjunction with a different one of the five IRDs 8-12.

By implementing the methods described above, client systems for which the first, second and third IRDs 35-37 accept multicast IP datagrams are assigned to a first subscriber group. Client systems for which the fourth and fifth IRDs 11,12 accept multicast IP datagrams carrying group messages are assigned to a different subscriber group. Thus, a multicast IP datagram for the first subscriber group is forwarded once by each router system between the CA system 1 and the first multicast router 35. A multicast IP datagram for the second subscriber group is forwarded once until it reaches the fourth multicast router 38. Only then are two separate copies forwarded to the fourth and fifth IRDs 11, 12. These copies 'tunnel' past the fifth and sixth routers 41,42, respectively, which are, as noted, not multicast-enabled. If any client system using one of the first to third IRDs 8-10 were to be assigned to the same group as one using one of the fourth and fifth IRDs 11,12, then separate copies would be made much further upstream. Thus, this particular manner of allocating client systems to subscriber groups saves bandwidth.

Returning to FIG. 3, the IRD device 13 obtains a random number (operation 45), in an example embodiment, from the smart card 22. The random number serves as verification data, as will be explained later. The smart card 22, or the IRD device 13 retains information representative of the random number in memory, for later verification. The IRD device includes the random number in the registration request message it is building, adding it to the IP address received in operation 44.

The IRD device 13 subsequently (operation 46), or concurrently, obtains a subscriber identification as stored on a sector of the smart card 22. This data is received through the CA module 20. The registration request message includes the subscriber identification or information enabling the subscriber's identity to be established.

The thus built registration request message is first submitted to the smart card 22 (operation 47). The smart card 22 is arranged to store a secret key, which is used to digitally sign and/or encrypt the registration request message. In this state, the IRD device 13 receives it back (operation 48) from the smart card 22.

Subsequently (operation 49) the registration request message is sent to the CA system 1. The registration request message is sent using UDP over IP.

To prevent the IRD device 13 from 'hanging up', it starts a timer (operation 50). It expects to receive a registration response message from the CA system 1 within a time-interval $\Delta t$. If it doesn't, operation 49 is repeated, with the time-interval being set to randomly increasing values $\Delta t$.

Figure 4:
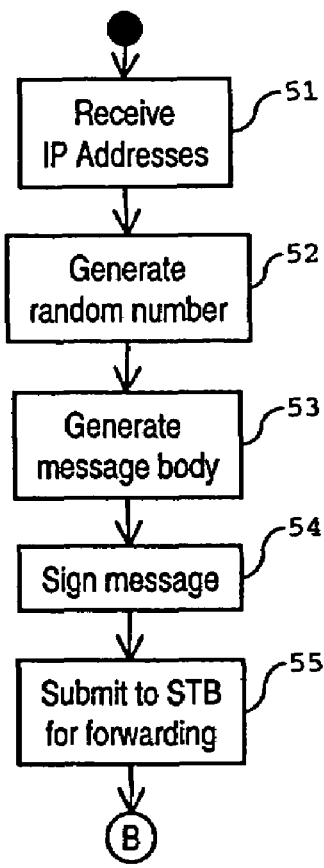
FIG. 4 is a flow chart relating to a second variant of a method of requesting registration of a client system.
Figure 5:
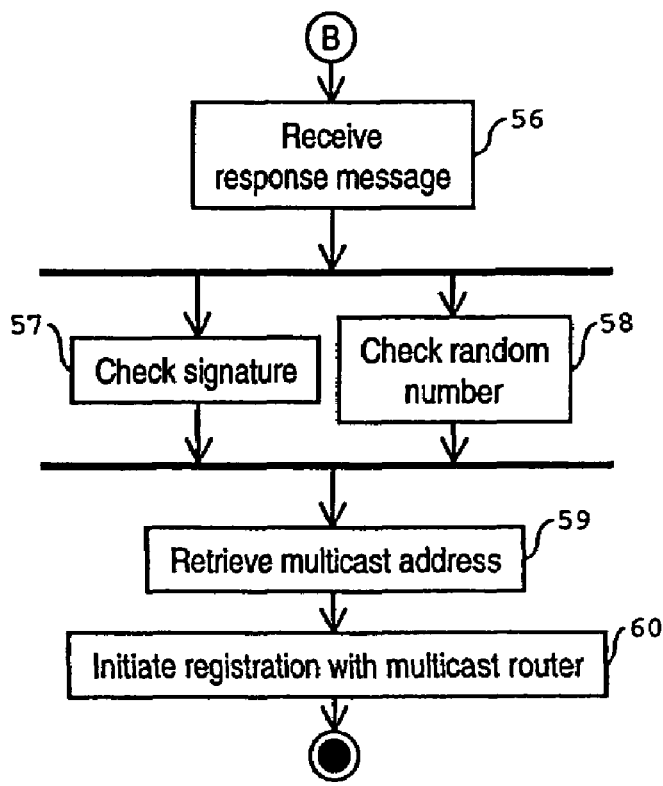
FIG. 5 is a flow chart illustrating several operations carried out upon receipt of a registration response message.

Processing continues as illustrated in FIG. 5. An alternative to the operations shown in FIG. 3, which alternative is shown in FIG. 4, will be explained first. In this alternative, the method of requesting delivery of EMMs is carried out by the smart card 22, rather than the IRD device 13. To this end, the smart card 22 executes instructions stored in memory 25. In one embodiment, these instructions take the form of an application downloaded via the IRD device 13 through the Internet 7.

The IRD device 13 is directed to obtain the IP address of the nearest multicast router system using any of the methods described above in connection with operation 43 of FIG. 3. The smart card 22 receives the obtained IP address (operation 51) through the interface 23 to the CA module 20. In the illustrated embodiment, it also receives the unicast IP address of the IRD device 13. It then generates a random number (operation 52) and the body of a registration request message (operation 53). This includes the received IP address of the nearest multicast router and the random number, as well as a subscriber identification. It further includes the unicast IP address of the IRD device 13 received in operation 51. In one embodiment, the subscriber identification is formed by data representing the smart card serial number. In one embodiment, the message body includes a hash of one or more other items of information included in the message body. Hashing is always a one-way operation. The hash function chosen is designed to ensure that it is impossible to derive the input values from an analysis of the hash value(s) generated by applying it, and that no two different inputs lead to the same hash value.

The message body is signed (operation 54). In one embodiment (not shown), it is encrypted. Then, the registration request message is passed to the IRD device 13 (operation 55). In one embodiment, the IP address of the CA system 1 is retrieved from memory in the IRD device 13. In an alternative embodiment, the smart card 22 informs the IRD device 13 of the IP address of the server 1. The IRD device 13 generates an IP datagram carrying the registration request message, and including the unicast IP address of the CA system 1 in its header.

In the example discussed herein, the CA system 1 receives the registration request message. If the message is received in encrypted form, it is decrypted. The subscriber identification in the registration request message is retrieved and referred to the SMS 2. Thus, it is verified that the client system from which the message originated is authorised to receive EMMs intended for all client systems in the subscriber group it is about to be assigned to. Only if such authorisation is present is the client system assigned to the subscriber group. If the message is signed, the signature is verified, using a public key corresponding to a private key held in the smart card 22. The subscriber identification is, in an example embodiment, used to retrieve the appropriate public key for verifying the authenticity of the signature.

The hash value included in the registration request message is re-generated from the contents of the registration request message, and compared with the hash value transmitted with the registration request message.

The CA system 1 further retrieves the unique (e.g. unicast) IP address of the IRD device 13 that is configured to accept multicast messages for the client system that sent the registration request message.

Assuming it is authorised to receive the requested EMMs the requesting client system is assigned to a subscriber group receiving EMMs for the requested service. A subscriber group is chosen that includes at least one further client system that indicated the same nearest multicast router address in its registration request message.

The client system is enabled to receive the EMMs by means of a registration response message, generated by the CA system 1. The registration response message includes the random number, or information uniquely dependent on the random number, included in the registration request message. The registration response message further includes at least one key of at least one key pair. In an example embodiment, it includes one key of each of three key pairs. One key pair is used for unicasting messages to a client system. One key pair used for encryption of group messages addressed to a subscriber group. One key is used to encrypt broadcast messages addressed to populations of client systems spanning more than one subscriber group. The registration response message also includes the multicast address of at least the common multicast group of the subscriber group to which the requesting client system has been assigned. In some embodiments, it will further include a multicast address for addressing all members of a plurality of subscriber groups. In an example embodiment, the registration response message includes a hash value based on some or all of the data included in the remainder of the registration response message. In the illustrated embodiment, it includes a digital signature.

Returning to FIG. 5, the IRD device 13 receives the registration response message (operation 56). The signature appended to it is verified using a public key of the CA system 1 (operation 57). The random number is checked against the copy retained at operation 45 or 52 (operation 58). The multicast address applicable to the common multicast group of the subscriber group to which the client system has been assigned is retrieved subsequently (operation 59).

The IRD device 13 is triggered to initiate registration with the nearest multicast router. In particular, it sends a message in accordance with the Internet Group Management Protocol, notifying the nearest multicast router system of the multicast address retrieved in operation 59. Thus, the IRD device 13 joins the multicast group. It is enabled to receive IP datagrams including the multicast address in the destination address field of the header. At least one of these IP datagrams includes a payload encrypted under a key of a key pair. The corresponding key to decrypt the payload is retrieved from the registration response message and stored in memory in the smart card 22. Where symmetric encryption is used, the keys of the key pair will, incidentally, be the same.

An example embodiment of the invention is not limited to the embodiments described above, which may be varied within the scope of the accompanying claims. For example, the hash value(s) and signature(s) in the registration request message and/or registration response message may be combined, in that the signature is a cryptogram of the hash value.

What is claimed is:

1. A method to control communications between a head-end system and a number of client systems through a network including a plurality of multicast router systems and receivers, the method comprising:

forwarding, from each of the plurality of multicast router systems, multicast messages, the multicast messages being transmitted from the head-end system and addressed to respective multicast groups to select ones of the plurality of receivers enabled to accept, for a client system, messages addressed to any multicast group of which the receiver is a member, for each receiver, only a nearest one of the plurality of multicast router systems forwarding a copy of a message addressed to the multicast groups of which the receiver is a member directly to the receiver;

maintaining subscriber group information linking each registered one of the number of client systems to an associated one of a plurality of subscriber groups;

allocating registered client systems to at least one multicast group, such that all client systems associated with a particular subscriber group are in a common multicast group, a server in the head-end being arranged to multicast subscriber group messages to client systems in messages addressed to a multicast group, each subscriber group message being intended for all client systems in a subscriber group;

obtaining information uniquely identifying the nearest multicast router system nearest to a receiver for a first client system; and assigning the first client system to a subscriber group including at least one further client system having the same nearest multicast router system.

2. The method according to claim 1, wherein the operation of obtaining information uniquely identifying the nearest multicast router system includes receiving a registration request message from the first client system, including a network address unique to the nearest multicast router system nearest to the receiver for the first client system.

3. The method according to claim 1, further comprising:
receiving a registration request message from the first client system including an identification of the first client system; and
verifying that the first client system is authorized to receive messages intended for all client systems in the subscriber group, wherein the first client system is only assigned to the subscriber group if authorized.

4. The method according to claim 3, further comprising:
receiving a registration request message including a digital signature;
using the identification to retrieve a public key of the client system; and
using the public key to verify the authenticity of the signature.

5. The method according to claim 1, further comprising:
receiving a registration request message from the first client system, including a network address unique to a receiver configured to accept multicast messages for the first client system; and
returning a registration response message to the network address unique to the receiver upon assigning the first client system to the subscriber group, the registration response message including a multicast network address of at least the common multicast group of the subscriber group to which the first client system has been assigned.

6. The method according to claim 5, including:
receiving a registration request message including verification data; and
forming a registration response message including data representative of at least part of the verification data.

7. The method according to claim 1, further comprising:
receiving a registration request message from the first client system, including a network address unique to a receiver configured to accept multicast message for the first client system;
returning a registration response message to the network address unique to the receiver upon assigning the first client system to the subscriber group, the registration response message including at least one key of at least one key pair; and
subsequently transmitting at least one group message addressed to the common multicast group and encrypted under the other key of the key pair.

8. The method according to claim 7, wherein the network is selected to be a packet switched network using the Internet Protocol, including transmitting group messages from the server in single packets having a payload and a header, wherein each packet payload is encrypted separately.

9. The method according to claim 1, including assigning the first client system to a subscriber group including only further client systems having the same nearest multicast router system.

10. The method according to claim 1, further comprising upon determining that a different one of the multicast router systems has become the nearest multicast router system for a receiver enabled to accept multicast messages for the first client system, removing the first client system from the subscriber group.

11. A system to control communication between a head-end system and a number of client systems through a network, the system comprising:
a plurality of multicast router systems and receivers, each of the plurality of multicast router systems being configured to forward multicast messages transmitted from the head-end system and addressed to respective multicast groups to select ones of the plurality of receivers enabled to accept, for a client system, messages addressed to any multicast group of which the receiver is a member, for each receiver, only a nearest one of the plurality of multicast router systems is configured to forward a copy of a message addressed to the multicast groups of which the receiver is a member directly to the receiver;
a database to maintain subscriber group information linking each registered one of the number of client systems to an associated one of a plurality of subscriber groups, the system being configured to allocate registered client systems to at least one multicast group, such that all client systems associated with a particular subscriber group are in a common multicast group; and
a server in the head-end system being arranged to multicast subscriber group messages to client systems in messages addressed to a multicast group, each subscriber group message being intended for all client systems in a subscriber group, the system being further configured to obtain information uniquely identifying the nearest multicast router system nearest to a receiver for a first client system, and to assign the first client system to a subscriber group including at least one further client system having the same nearest multicast router system.

12. A machine-readable storage medium storing a set of instructions that, when executed by a machine, cause the machine to perform a method to control communications between a head-end system and a number of client systems through a network including a plurality of multicast router systems and receivers, the method comprising:
forwarding, from each of the plurality of multicast router systems, multicast messages, the multicast messages being transmitted from the head-end system and addressed to respective multicast groups to select ones of the plurality of receivers enabled to accept, for a client system, messages addressed to any multicast group of which the receiver is a member, for each receiver, only a nearest one of the plurality of multicast router systems forwarding a copy of a message addressed to the multicast groups of which the receiver is a member directly to the receiver;
maintaining subscriber group information linking each registered one of the number of client systems to an associated one of a plurality of subscriber groups;
allocating registered client systems to at least one multicast group, such that all client systems associated with a particular subscriber group are in a common multicast group, a server in the head-end being arranged to multicast subscriber group messages to client systems in messages addressed to a multicast group, each subscriber group message being intended for all client systems in a subscriber group;
obtaining information uniquely identifying the nearest multicast router system nearest to a receiver for a first client system; and
assigning the first client system to a subscriber group including at least one further client system having the same nearest multicast router system.

13. A method of requesting delivery to a first client system of group messages from a head-end system in communication with a number of further client systems through a network including a plurality of multicast router systems and receivers, the method comprising:
 forwarding, from each of the plurality of multicast router systems multicast messages, the multicast messages being transmitted from the head-end system and addressed to respective multicast groups to select ones of the plurality of receivers enabled to accept, for a client system, messages addressed to any multicast group of which the receiver is a member, for each receiver, only a nearest one of the plurality of multicast router systems forwarding a copy of a message addressed to the multicast groups of which the receiver is a member directly to the receiver;
 maintaining group information on the head-end system including a registration system to link each registered one of the number of client systems to an associated one of a plurality of groups and allocating multicast addresses to the client systems such that all client systems associated with a particular group have a common multicast address; and
 multicasting the group messages from a server to at least one of the client systems in messages having a multicast address, each group message being intended for all client systems in a group, characterized by obtaining information uniquely identifying a nearest multicast router system nearest to a receiver for the first client system; and
 transmitting a registration request message to the registration system including the obtained information, to enable the registration system to assign the first client system to a subscriber group including at least one further client system having the same nearest multicast router system.

14. The method according to claim 13, wherein the information uniquely identifying the nearest multicast router system is selected to be a network address unique to the multicast router system and obtained by exchange of messages in accordance with a network protocol.

15. The method according to claim 13, further comprising:
 receiving a registration response message including the common multicast address allocated to the subscriber group to which the first client system has been assigned; and
 transmitting a message notifying the nearest multicast router system of the common multicast address.

16. The method according to claim 13, wherein the receiver includes an interface to at least one device in which the first client system is included, the method further comprising:
 receiving at least information representative of a subscriber identification from the first client system through the interface; and
 transmitting a registration request message to the registration system further including the subscriber identification.

17. The method according to claim 16, wherein the first client system is selected to be included in a tamper-proof environment of a secure device, and wherein the first client system is arranged to store a secret key and the registration request message is at least signed by the first client system.

18. The method according to claim 13, wherein the first client system is included in a device having an interface to the receiver for the first client system, the method further comprising:
 receiving the information uniquely identifying a nearest multicast router system nearest to the receiver from the receiver through the interface; and
 returning the registration request message through the interface to the receiver to forward to the registration system.

19. The method according to claim 13, further comprising:
 retrieving a network address unique to the receiver for the first client system; and
 including the network address unique to the receiver in the registration request message.

20. The method according to claim 19, further comprising:
 receiving a registration response message including at least one key of at least one key pair in a message under the network address unique to the receiver;
 subsequently receiving at least one encrypted group message addressed to the common multicast group; and
 decrypting the encrypted group message using the other key of the appropriate key pair.

21. The method according to claim 13, further comprising:
 transmitting a registration request message to the registration system including verification data;
 receiving a registration response message including the common multicast address allocated to the subscriber group to which the first client system has been assigned and response data; and
 verifying that the response data includes information representative of at least part of the verification data.

22. A machine-readable storage medium storing an instruction that, when executed by one or more processors, causes at least one of the one or more processors to perform a method to control communication between a head-end system and a number of client systems through a network including a plurality of multicast router systems and receivers, the method comprising:
 forwarding, from each of the plurality of multicast router systems multicast messages the multicast messages being transmitted from the head-end system and addressed to respective multicast groups to select ones of the plurality of receivers enabled to accept, for a client system, messages addressed to any multicast group of which the receiver is a member, for each receiver, only a nearest one of the plurality of multicast router systems forwarding a copy of a message addressed to the multicast groups of which the receiver is a member directly to the receiver;
 maintaining subscriber group information linking each registered one of the number of client systems to an associated one of a plurality of subscriber groups;
 allocating registered client systems to at least one multicast group, such that all client systems associated with a particular subscriber group are in a common multicast group;
 multicasting group messages, from a server in the head-end system, to client systems in messages addressed to a multicast group, each subscriber group message being intended for all client systems in a subscriber group, which method is characterized by obtaining information uniquely identifying the nearest multicast router system nearest to a receiver for a first client system; and
 assigning the first client system to a subscriber group including at least one further client system having the same nearest multicast router system.

* * * * *